(12) United States Patent
Giering et al.

(10) Patent No.: US 9,732,812 B2
(45) Date of Patent: Aug. 15, 2017

(54) VEHICLE BRAKE HAVING SPINDLE/NUT ARRANGEMENT

(75) Inventors: Wilfried Giering, Ridgeway (CA); Ralf Erben, Kemmenau (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 13/580,493

(22) PCT Filed: Feb. 23, 2011

(86) PCT No.: PCT/EP2011/000883
§ 371 (c)(1),
(2), (4) Date: Aug. 31, 2012

(87) PCT Pub. No.: WO2011/104015
PCT Pub. Date: Sep. 1, 2011

(65) Prior Publication Data
US 2012/0325597 A1   Dec. 27, 2012

(30) Foreign Application Priority Data
Feb. 23, 2010   (DE) .................. 10 2010 008 927

(51) Int. Cl.
*F16D 55/08* (2006.01)
*F16D 65/14* (2006.01)
(Continued)

(52) U.S. Cl.
CPC .......... *F16D 65/14* (2013.01); *F16D 2121/02* (2013.01); *F16D 2121/14* (2013.01); *F16D 2123/00* (2013.01); *F16D 2125/40* (2013.01)

(58) Field of Classification Search
CPC .. F16D 65/14; F16D 2121/02; F16D 2121/14; F16D 2123/00; F16D 2125/40
(Continued)

(56) References Cited

U.S. PATENT DOCUMENTS 2,373,722 A * 4/1945 Von Opel Fritz ......... F16B 5/10
                                                              220/243
3,770,082 A * 11/1973 Brooks et al. ............... 188/71.9
(Continued)

FOREIGN PATENT DOCUMENTS

CN    87106666 A    7/1988
CN    1389654 A    1/2003
(Continued)

OTHER PUBLICATIONS

Search Report, The State Intellectual Property Office of China, Application No. 201180010463.0 dated Mar. 31, 2014.
(Continued)

*Primary Examiner* — Melody Burch
(74) *Attorney, Agent, or Firm* — MacMillan, Sobanski & Todd, LLC (57) ABSTRACT

A hydraulic vehicle brake has a piston which acts upon a friction element and is displaceable by a rotationally drivable spindle/nut arrangement into an actuating position. A spindle of the spindle/nut arrangement is secured against rotation and movable by the spindle nut either into abutment against the piston or away from the piston. The spindle nut comprises a first part, which at least close to one end thereof is configured for screw-type engagement with the spindle, and a second part, configured for rotationally driving the first part and connected to the first part by a rotationally fixed connection. The first part at an other end thereof is provided with a support surface for the rotatable, axial mounting of the spindle/nut arrangement and the second part at the other end extends into the first part.

15 Claims, 5 Drawing Sheets (51) Int. Cl.
*F16D 65/00* (2006.01)
*F16D 121/02* (2012.01)
*F16D 121/14* (2012.01)
*F16D 123/00* (2012.01)
*F16D 125/40* (2012.01)

(58) Field of Classification Search
USPC .......... 188/72.1, 72.4, 72.7, 72.8, 72.9, 73.1
See application file for complete search history.

(56) References Cited

U.S. PATENT DOCUMENTS

| | | | | |
|---|---|---|---|---|
| 3,920,102 A | * | 11/1975 | Ito | 188/71.9 |
| 3,934,684 A | * | 1/1976 | Evans | 188/71.9 |
| 4,793,447 A | | 12/1988 | Taig et al. | |
| 5,086,884 A | | 2/1992 | Gordon et al. | |
| 5,123,505 A | * | 6/1992 | Antony | 188/71.9 |
| 5,219,047 A | | 6/1993 | Fouilleux et al. | |
| 6,053,289 A | * | 4/2000 | Bauer | F16D 65/567 188/196 C |
| 6,315,092 B1 | * | 11/2001 | Schwarz | 188/265 |
| 6,394,235 B1 | | 5/2002 | Poertzgen et al. | |
| 6,719,103 B1 | * | 4/2004 | Kapaan | 188/72.8 |
| 8,069,961 B2 | * | 12/2011 | Watada | 188/72.8 |
| 2003/0164271 A1 | * | 9/2003 | Boisseau | 188/72.7 |
| 2004/0200673 A1 | * | 10/2004 | Gutierrez Fernandez | 188/2 D |

FOREIGN PATENT DOCUMENTS

| | | |
|---|---|---|
| DE | 19508253 A1 | 9/1996 |
| DE | 19831838 A1 | 7/1999 |
| DE | 102006018952 A1 | 10/2007 |
| EP | 0127314 A2 | 12/1984 |
| EP | 0996560 B1 | 5/2000 |

OTHER PUBLICATIONS

Chinese Office Action, Application 201180010463.0, dated Jul. 11, 2014.

2nd Notification of Office Action in the State Intellectual Property Office of China in Application No. 20118001046.0 dated Jul. 11, 2014.

\* cited by examiner

VEHICLE BRAKE HAVING SPINDLE/NUT ARRANGEMENT

CROSS-REFERENCE TO RELATED APPLICATIONS

This application is a national stage of International Application No. PCT/EP2011/000883 filed Feb. 23, 2011, the disclosures of which are incorporated herein by reference in entirety, and which claimed priority to German Patent Application No. DE 10 2010 008 927.3 filed Feb. 23, 2010, the disclosures of which are incorporated herein by reference in entirety.

BACKGROUND OF THE INVENTION

The invention relates to a vehicle brake, having a housing and a brake piston arranged therein, which piston acts upon a friction element and is displaceable by means of a rotationally drivable spindle/nut arrangement arranged coaxially with the central axis of the brake piston into an actuating position, in which the brake piston presses the friction element against a rotor of the vehicle brake, wherein the spindle is secured against rotation and is moved by means of a rotation of the spindle nut in a translatory manner along the central axis either into abutment against the brake piston or away from the brake piston in dependence upon the direction of rotation. A similar, also hydraulically actuable vehicle brake is known from European Patent EP 0 996 560 B1.

Vehicle brakes of the described type may be used as a service brake and also as a hand brake—also known as a parking brake—because by means of the spindle/nut arrangement the brake piston may be displaced mechanically into a position, in which it presses a friction lining of the brake against a brake disk or brake drum. The rotary driving of the spindle/nut arrangement that is required for this purpose is effected as a rule in a motorized manner, for example by means of an electric motor. If the vehicle brake is additionally also hydraulically actuable, then service braking operations are implemented conventionally by applying hydraulic pressure, which is supplied to the vehicle brake from an associated hydraulic vehicle brake system.

BRIEF SUMMARY OF THE INVENTION

The underlying feature of the invention is to achieve an even more compact design of such a vehicle brake and moreover improve the force path within the vehicle brake. The improved vehicle brake is moreover to be adaptable as easily as possible to various types of rotary drive of the spindle/nut arrangement.

Proceeding from the initially described, generic vehicle brake this feature is achieved according to the invention in that the spindle nut comprises a first part, which at least close to its one end is configured for screw-type engagement with the spindle, and a second part, which is configured for rotationally driving the first part and is connected to the first part by a rotationally fixed connection, wherein the first part at its other end remote from the one end is provided with a support surface for the rotatable, axial mounting of the spindle/nut arrangement and the second part at the other end extends into the first part.

According to the invention the spindle nut accordingly comprises two parts, which are manufactured separately and then connected in a rotationally fixed manner to one another. For example, these two parts may be manufactured economically by forming as cold extruded parts, because machining of the spindle nut is necessary only at the support surface used for mounting and at the thread that interacts with the spindle. Because the second part extends into the first part of the spindle nut, the overall length of the spindle nut may be kept short. By means of the support surface on the first part of the spindle nut an immobilizing force is transmitted from the brake piston, without major changes in diameter, to the spindle and the spindle nut and is introduced by the latter, again without any significant change in diameter, into the housing of the vehicle brake. Finally, by virtue of the two-part construction of the spindle nut it is possible to adapt the entire mechanism to different rotary drives by modifying only the second part.

In preferred embodiments of the vehicle brake according to the invention the rotationally fixed connection is a polygonal connection, a compression connection or a toothed connection. It is also possible to use a combination of a polygonal connection or toothed connection and a compression connection. Further types of rotationally fixed connection are possible.

In order to keep the overall length of the spindle/nut arrangement as short as possible, in preferred embodiments the second part of the spindle nut at its side facing the first part is of a hollow-cylindrical configuration so that the spindle may extend, depending on the actuating position, into the hollow space thus formed. At its side remote from the first part the second part is preferably provided with a connection for an external rotary drive. This connection may for example take the form of a hexagon socket or a multi-grooved profile.

In order to be able to accommodate the spindle/nut arrangement in a space-saving manner, the brake piston of the vehicle brake is preferably open at one end and of a hollow-cylindrical configuration. In order to secure the spindle against torsion, in preferred embodiments of the vehicle brake according to the invention the spindle has a mushroom-shaped spindle head that is guided axially in a twistproof manner in the brake piston. A twistproof guidance of the spindle head in the hollow-cylindrical brake piston is achievable in various ways. In one embodiment the spindle head at its circumference is provided with a plurality of radial projections, which engage into axial grooves that are formed in an inner circumferential surface of the hollow-cylindrical brake piston. A single radial projection on the spindle head that engages into a corresponding axial groove of the brake piston is however also adequate as an anti-rotation device. Equally the brake piston may be provided with an inwardly protruding axial projection that engages into a groove on the spindle head. An anti-rotation device for the spindle is moreover achievable also by means of a spindle head, the circumference of which is not circular and which is guided in a correspondingly shaped hollow-cylindrical recess of the brake piston. Further possibilities are conceivable.

If the spindle/nut arrangement has a spindle head with a diameter that is greater than the diameter of the spindle nut, then in preferred embodiments the spindle head at its underside facing the spindle is provided with an indentation extending in a circumferential direction, which has a front end face serving as a stop for a projection that is formed at the front end of the spindle nut facing the spindle head. In such embodiments the front stop face on the one hand serves as a reference position, in which the spindle is fully retracted, and on the other hand prevents a "driving home" of the spindle head on the spindle nut, with the undesirable consequence of extremely high release forces. Preferably the indentation in the underside of the spindle head is fashioned in such a way that its depth increases continuously in the direction of and up to its front end face. In a corresponding manner the projection at the front end of the spindle nut is preferably of a complementary design to the shape of the indentation, i.e. has for example the shape of a continuously ascending ramp with for example a semicircular cross section, which ramp terminates in a stop face that corresponds to the cross-sectional shape of the ramp and is intended to interact with the front end face of the indentation.

For space-saving and low-friction mounting of the spindle/nut arrangement, in preferred embodiments the support surface is supported on an annular plain- or needle bearing, which is in turn supported against the housing of the vehicle brake and through which the second part of the spindle nut projects. In such embodiments the support surface accordingly surrounds the second part of the spindle nut in an annular manner, thereby on the one hand creating a broad support base and on the other hand achieving a very advantageous—because substantially deflection-free—course of the support force from the spindle head through the first part of the spindle nut into the brake housing.

The vehicle brake according to the invention may be actuable exclusively by means of the spindle/nut arrangement, i.e. service braking operations and/or a parking brake function are achieved by a change of length of the spindle/nut arrangement, but the brake piston or a corresponding component of the brake may be displaced into the actuating position also by means of hydraulic pressure, which may be introduced into a hydraulic chamber that interacts with the brake piston or the corresponding component. If hydraulic actuation is provided, this is used as a rule for the service braking operations, while the spindle/nut arrangement is used only in a stationary state of the vehicle to realize a parking brake function. In an emergency situation, say in the event of failure of the hydraulic actuation, the spindle/nut arrangement may be used also for service braking operations. The vehicle brake according to the invention may take the form of a disk brake or a drum brake.

In all embodiments of the vehicle brake according to the invention the spindle/nut arrangement may be of a self-locking design, usually by virtue of suitable selection of the lead of a thread that connects the nut to the spindle. A self-locking spindle/nut arrangement makes it possible to dispense with a separate arresting device once the vehicle brake, in order to realize the parking brake function, has been locked by rotation of the spindle nut.

Other advantages of this invention will become apparent to those skilled in the art from the following detailed description of the preferred embodiments, when read in light of the accompanying drawings.

DETAILED DESCRIPTION OF THE INVENTION

Figure 1:
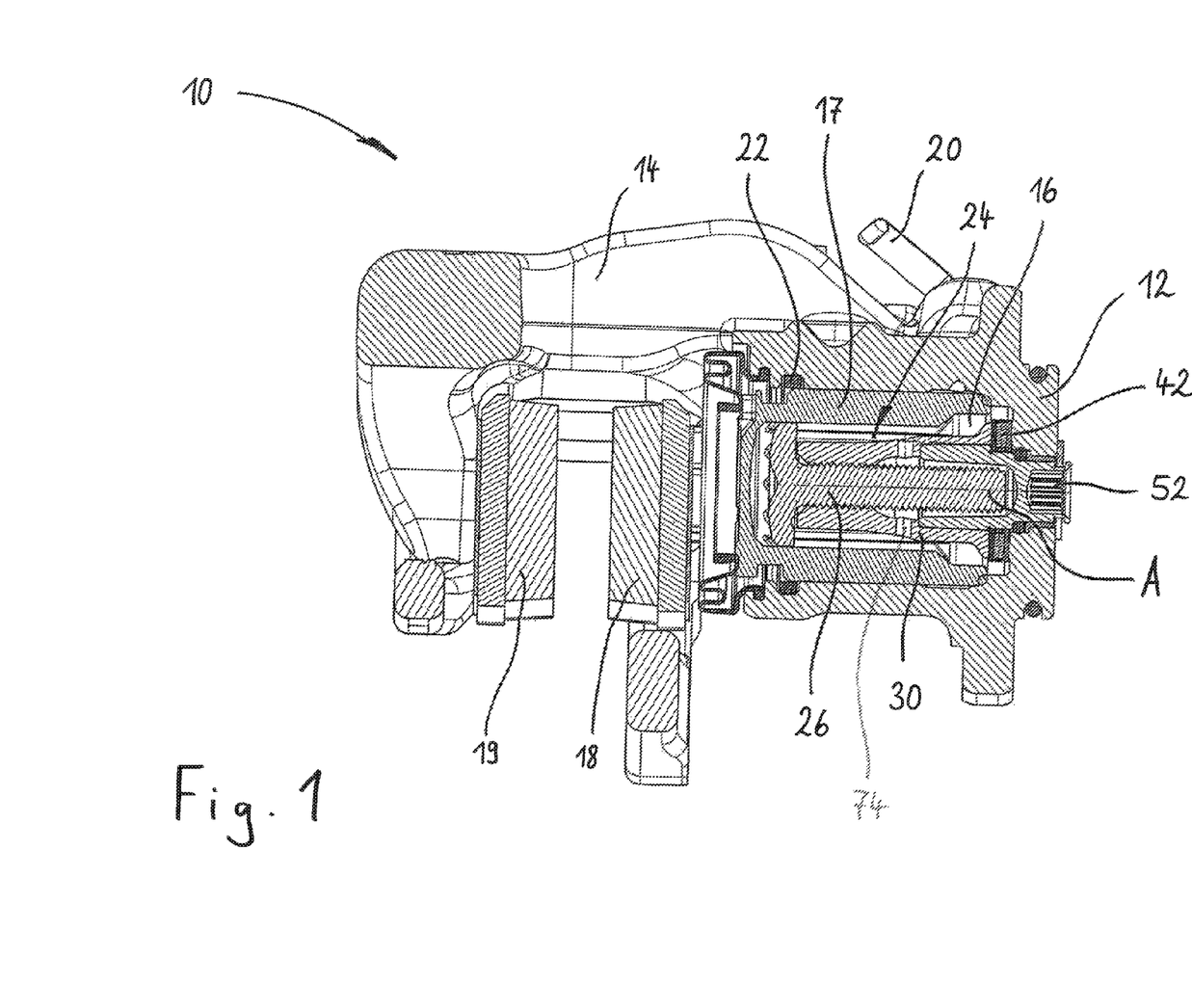
FIG. 1 illustrates a vehicle brake according to the invention in the form of a disk brake, which is also hydraulically actuable, in cross section.

The vehicle brake reproduced in FIG. 1 and generally denoted by 10 is configured here as a floating-caliper disk brake, which in a known manner comprises a housing 12, on which is displaceably mounted a floating caliper 14 that straddles a brake disk, which is not represented here. Situated in the housing 12 is a hydraulic chamber 16, in which a brake piston 17 is accommodated sealingly and displaceably along its longitudinal central axis A. For supplying the hydraulic chamber 16 with hydraulic fluid there is provided on the outside of the vehicle brake 10 a connection 20, which is in communication with a brake pressure generating unit that is not represented here, for example a brake-booster/master-cylinder unit that is actuable via a brake pedal. Upon actuation of the brake pressure generating unit the hydraulic fluid in the hydraulic chamber 16 is pressurized, so that the brake piston 17 is displaced to the left along the axis A in order to move friction linings 18, 19 into frictional engagement with the non-represented brake disk. When actuation of the brake pressure generating unit is terminated, hydraulic fluid may flow out of the hydraulic chamber 16 back in the direction of the brake pressure generating unit, so that the brake piston 17 is displaced back along the axis A in order to move the friction linings 18, 19 out of engagement with the brake disk. A radially circumferential sealing element denoted by 22, which seals off the brake piston 17 in the hydraulic chamber 16, assists the resetting of the brake piston 17 in that in accordance with the "rollback" principle it exerts a resilient resetting force on the brake piston 17. The operation of the disk brake 10 just described and occasioned by a hydraulic actuation, as well as the further mechanical construction of the disk brake 10 is well-known to experts in this field and therefore requires no further explanation.

Figure 2:
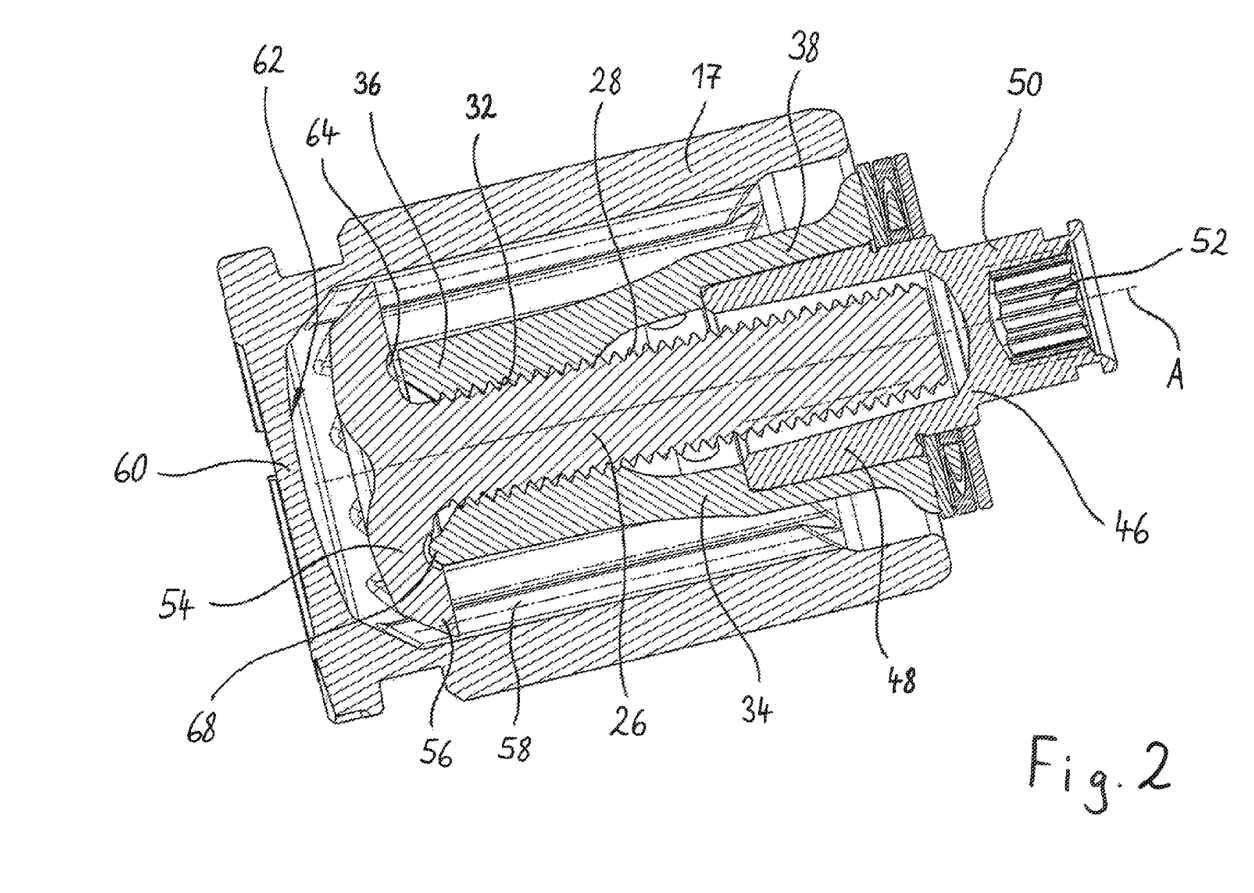
FIG. 2 illustrates a brake piston of the brake of FIG. 1 with a spindle/nut arrangement accommodated therein, in longitudinal section and in an enlarged view.

So that the illustrated vehicle brake 10 may not only fulfill the previously described function of a hydraulic service brake but may also be used as a parking- or hand brake, a spindle/nut arrangement generally denoted by 24 is provided, which comprises a spindle 26 arranged coaxially with the axis A and having an external thread 28 as well as a substantially sleeve-shaped spindle nut 30, which is provided with an internal thread 32 that matches the external thread 28 (see also FIG. 2).

Figure 3:
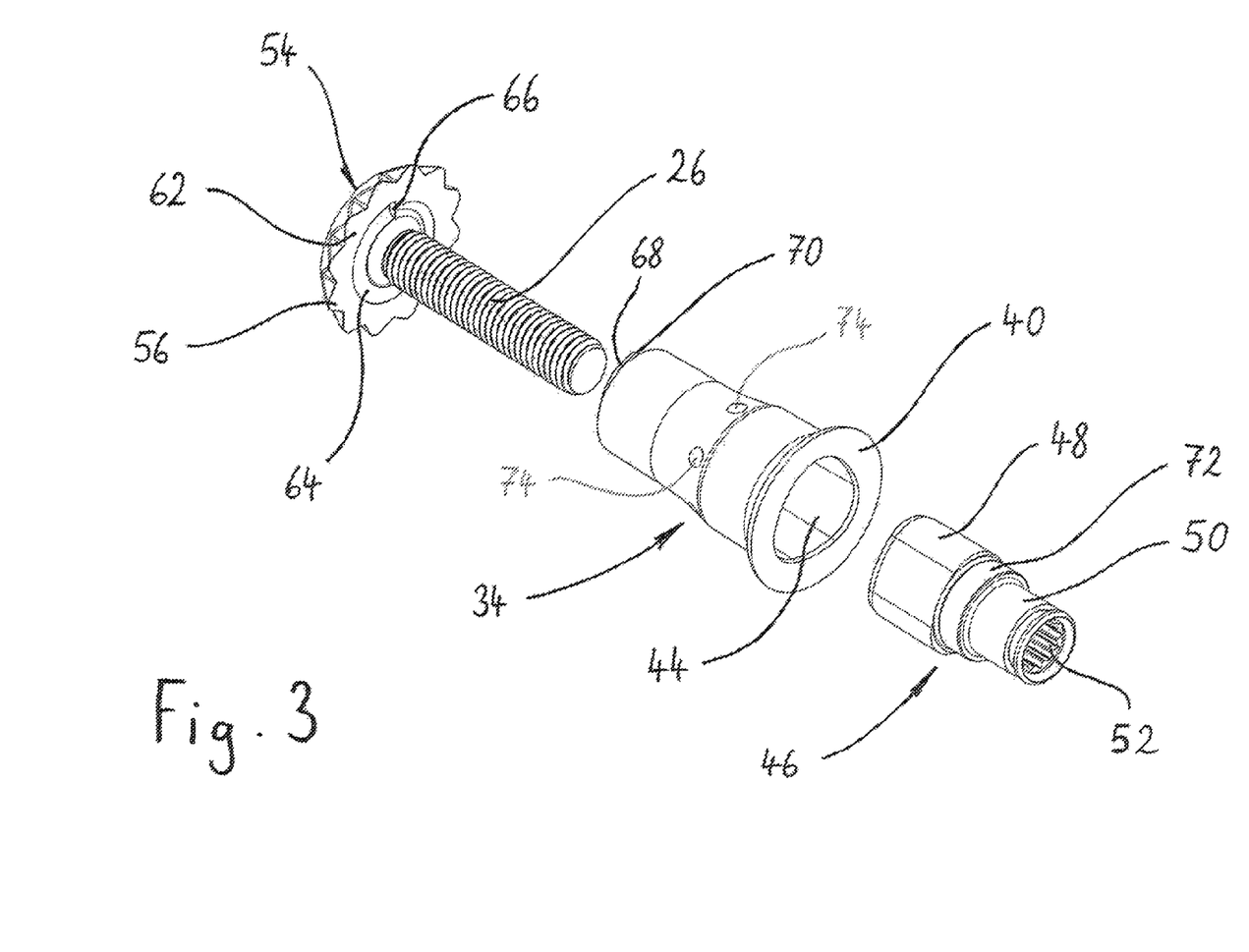
FIG. 3 illustrates the spindle/nut arrangement of FIG. 2 in an exploded, three-dimensional view.
Figures 4, 5:
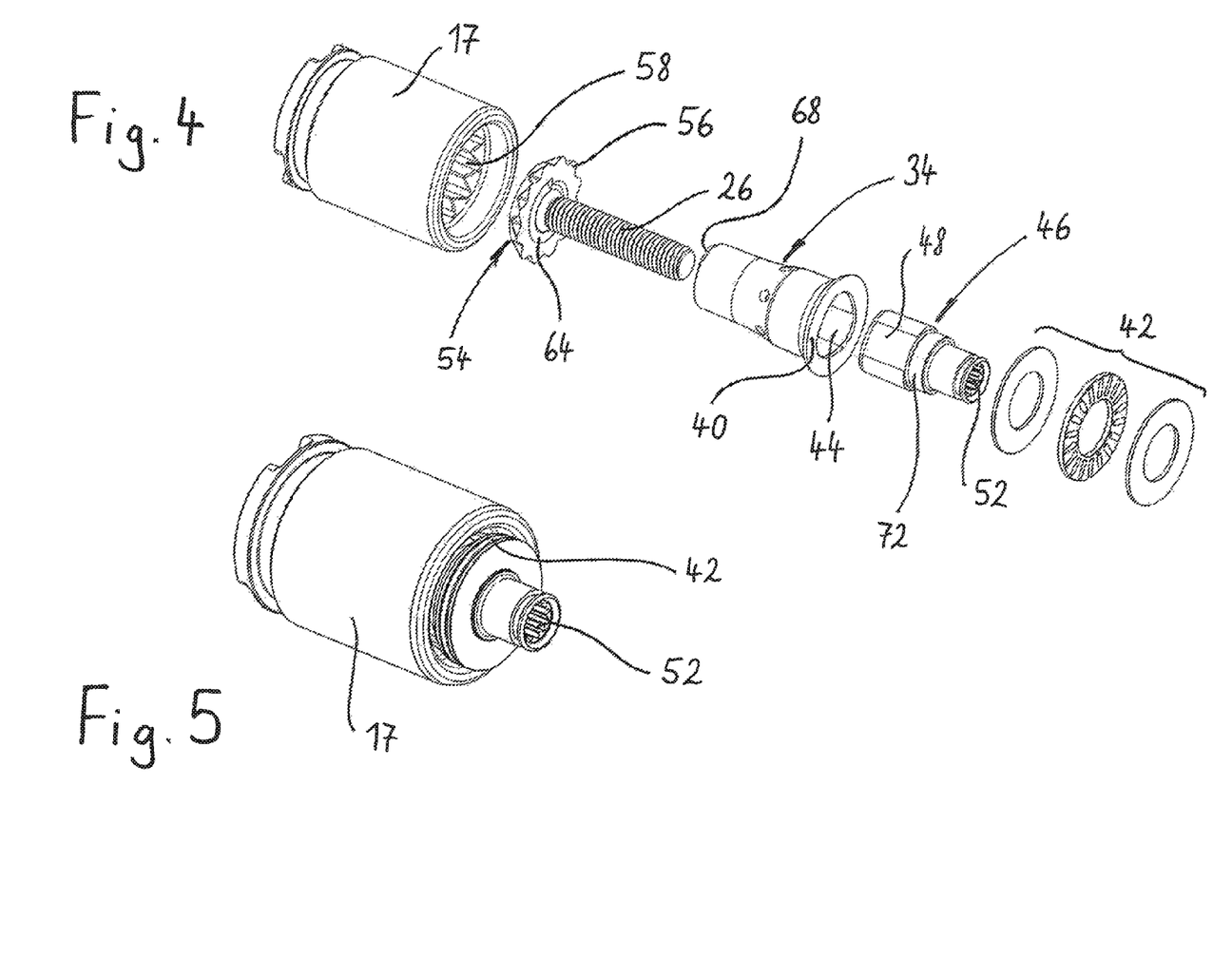
FIG. 4 illustrates the spindle/nut arrangement of FIG. 3 together with the brake piston and an axial bearing in an exploded, three-dimensional view.
FIG. 5 illustrates the arrangement of FIG. 4 in an assembled state.

The construction of the spindle/nut arrangement 24 emerges more clearly from FIG. 3. As is evident from this figure, the spindle nut 30 is of a two-part construction and comprises a sleeve-shaped, first part 34, of which the, in the figures left, end portion 36 is provided with the internal thread 32. The outside diameter of the first part 34, viewed from the left end portion 36, increases slightly in the illustrated manner in the direction of an, in the figures right, end portion 38, wherein there is formed on the right end, i.e. on the end remote from the end portion 36, a radial support surface 40, by which the spindle/nut arrangement 24 is supported via an axial bearing configured here as needle bearing 42 rotatably against the housing 12 of the vehicle brake 10 (see FIG. 1). Extending from the support surface 40 into the right end portion 38 of the first part 34 is a recess 44, the cross section of which in the present case is polygonal. The recess 44 serves to form-fittingly receive, in a circumferential direction, a second part 46 of the spindle nut 30 that for this purpose is provided with a polygonal, internally hollow stud 48 formed in a complementary manner to the recess 44. In the state of connection to the first part 34, the longitudinal central axis A of the brake piston 17 is also the longitudinal central axis of the spindle 26 and of the first part 34 and the second part 46 of the spindle nut 30. Integrally connected to the polygonal stud 48 is a further stud 50 with a circular cross section. A connection 52 for an external rotary drive is formed in this stud 50 and in the present case takes the form of an internal multi-grooved profile. By means of the rotary connection 52 a rotary drive, which is not represented here, may rotate the spindle nut 30 in both directions of rotation in order to screw the spindle 26 out of and back into the spindle nut 30 and hence change the effective length of the spindle/nut arrangement 24. This only works however if the spindle 26 is secured against co-rotation. In the illustrated embodiment this is achieved by the spindle 26 having a mushroom-shaped spindle head 54, which at its outer circumference is provided with a plurality of radial projections 56 that engage into axial grooves 58 provided in an inner circumferential surface of the hollow-cylindrical brake piston 17. As is evident in particular from FIG. 2 and FIG. 4, as a result of the interaction of the radial projections 56 with the axial grooves 58 the spindle head 54 is guided axially in a twistproof manner in the brake piston 17.

The spindle/nut arrangement 24 is accordingly used to convert a rotary motion of the spindle nut 30 to a translatory movement of the spindle 26 in order in this manner to move the brake piston 17 towards the non-illustrated brake disk and press the friction linings 18, 19 against the brake disk (parking brake function). As may be seen in particular from FIG. 2 and FIG. 5, which both reproduce the fully retracted state of the spindle/nut arrangement 24, i.e. the state of a released parking brake, the entire arrangement owing to its accommodation in the hollow part of the brake piston 17 and owing to the internally hollow construction of the first part 34 and the second part 46 of the spindle nut 30 is extremely compact and in this state projects only slightly from the brake piston 17.

For rotationally driving the spindle nut 30 it is possible to use for example an electric motor (not represented), which is capable of transmitting its rotary motion to the spindle nut 30 by means of an output shaft formed in a complementary manner to the rotary connection 52. The spindle/nut arrangement 24 is of a self-locking design so that its change of length achieved by means of rotation of the spindle nut 30 is maintained in each case after the rotary drive has stopped. A separate arresting device is therefore not required.

When the spindle 26 is screwed out of the spindle nut 30 as a result of rotation thereof, the upper side of the spindle head 54 comes into contact with the underside of a head 60 of the brake piston 17. To achieve the best possible abutment the upper side of the spindle head 54 and the underside of the piston head 60 are formed in a complementary manner in terms of their shape, so that the spindle head 54 is applied over a large area and hence in a material-sparing manner against the brake piston 17, thereby allowing good transmission of high locking forces.

In order to release a vehicle brake 10 that is locked as a result of increasing the length of the spindle/nut arrangement 24, the spindle nut 30 has to be rotated in the opposite direction. The spindle 34 is then screwed back into the spindle nut 30 and the spindle head 54 detaches from the underside of the piston head 60, with the result that there is no longer any locking force transmitted to the brake piston 17. In order during this release operation to prevent the spindle head 54 from being driven home too powerfully on the spindle nut 30, a situation which might occur in the fully retracted state of the spindle 26, and in order moreover to create a reference position corresponding to a fully retracted state of the spindle/nut arrangement 24, the spindle head 54 at its underside 62 facing the spindle nut 30 is provided with an indentation 64 extending in circumferential direction, which may be seen clearly in FIG. 3. The indentation 64 begins quite flat and increases in depth continuously in circumferential direction up to a front end face 66, which forms the end of the indentation 64 and serves as a stop, as will be explained below.

For interacting with the indentation 64 in the underside 62 of the spindle head 54 there is formed on the front end of the spindle nut 30 facing the spindle head 54 a projection 68, which is formed in a complementary manner to the indentation 64. The projection 68 is accordingly ramp-shaped with a semicircular cross section, the height of which increases continuously from its start to its end. The projection 68 terminates in a stop face 70 (see FIG. 3), which upon reaching the described reference position abuts against the front end face 66 of the indentation 64 and prevents further retraction of the spindle 26, without the spindle 26 being able to be driven home in the spindle nut 30.

In an advantageous manner a portion 72 of the first stud 48 that is adjacent to the further stud 50 of the second part 46 is designed with a circular cross section and serves as a centering surface for the needle bearing 42.

As already described, during operation of the vehicle brake 10 the hydraulic chamber 16 is filled with hydraulic fluid, the pressure of which ensures that the brake piston 17 is displaced in order to press the friction linings 18, 19 against the non-illustrated brake disk. To enable the entire cross-sectional area of the brake piston 17 to be loaded with hydraulic pressure, in the previously described embodiment of the spindle/nut arrangement 24 there is provided in the first part 34 of the spindle nut 30 a plurality of radial bores 74 (see FIG. 1 and FIG. 3), through which the interior of the spindle/nut arrangement 24 may be vented and filled with hydraulic fluid.

Figure 6:
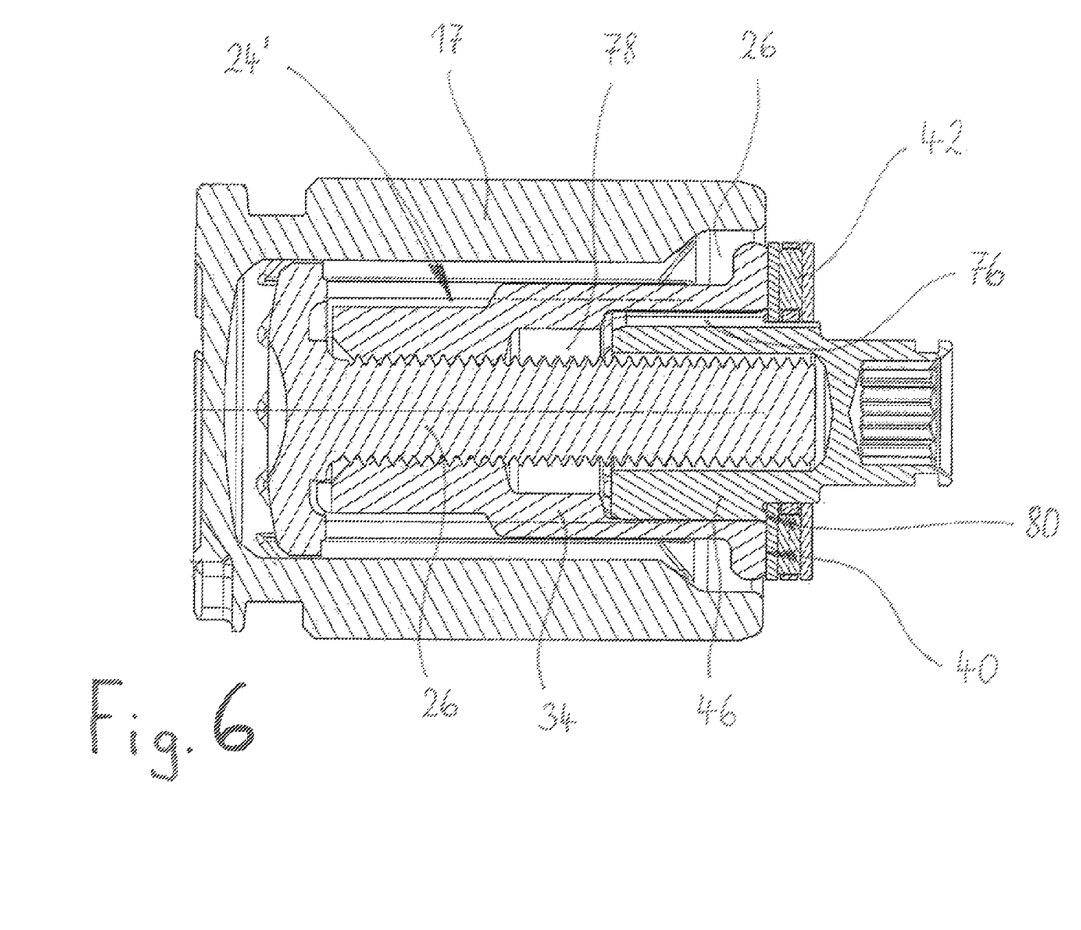
FIG. 6 illustrates a spindle/nut arrangement according to a modified embodiment.

FIG. 6 shows a longitudinal section through a modified embodiment of a spindle/nut arrangement 24', in which the first part 34 of the spindle nut 30 has no such bores 74. Instead, the second part 46 of the spindle nut 30 at its outer circumferential surface is provided with a substantially axially running channel 76, which extends over the entire length of the polygonal stud 48 and hence reaches from an internal hollow space 78 of the spindle/nut arrangement 24' to a point axially under the radially inner circumferential surface of the needle bearing 42. In this manner by means of the axial bearing in the form of needle bearing 42 a fluid-conveying connection is created between the inner hollow space 78 and the hydraulic chamber 16. Such an axial channel 76 is more economical to manufacture than the radial bores 74.

If the rotationally fixed connection between the first part 34 and the second part 46 of the spindle nut 30 is designed, not as described above as a polygonal connection, but for example as a toothed connection, say in the form of a multi-grooved profile, then the axial channel 76 may also be easily formed by a tooth gap of the toothed connection.

The axial support of the spindle/nut arrangement 24' is designed exactly the same as in the spindle/nut arrangement 24, i.e. via the support surface 40 of the first part 34 and via a further support surface 80 disposed radially inside of and flush with the surface 40 against the second part 46 of the spindle nut 30.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Vehicle brake, having a housing and a brake piston arranged therein, which brake piston acts upon a friction element and is displaceable by means of a rotationally drivable spindle/nut arrangement arranged coaxially with a central axis of the brake piston into an actuating position, in which the brake piston presses the friction element against a rotor of the vehicle brake, the spindle/nut arrangement comprising a spindle and a spindle nut, wherein the spindle is secured against rotation and is moved by means of a rotation of the spindle nut in a translatory manner along the central axis either into abutment against the brake piston or away from the brake piston in dependence upon a direction of rotation of the spindle nut,
   wherein the spindle nut comprises a one-piece first part and a second part, wherein the first part is in the form of a sleeve extending axially from one end to an other end, which at least close to the one end thereof is configured for and in direct threaded engagement with the spindle, and wherein the second part is configured for rotationally driving the first part and is connected to the first part by a rotationally fixed connection,
   wherein the first part at the other end thereof remote from the one end is provided with a support surface for the rotatable, axial mounting of the spindle/nut arrangement,
   wherein the second part at the other end extends into the first part, and wherein a recess extends from the support surface into the first part at the other end, which recess form-fittingly receives, in a circumferential direction, the second part of the spindle nut provided with a hollow stud formed complimentary to the recess,
   wherein the first part, at a surface of the first part facing the spindle, is, at least in sections, unthreaded.

2. Vehicle brake according to claim 1, wherein the rotationally fixed connection is a polygonal connection, a compression connection or a toothed connection.

3. Vehicle brake according to claim 1 wherein the second part at a side thereof facing the first part is of a hollow-cylindrical configuration.

4. Vehicle brake according to claim 3,
   wherein the second part at a side thereof remote from the first part has a connection for an external rotary drive.

5. Vehicle brake according to claim 1,
   wherein the brake piston is hollow-cylindrical and the spindle has a mushroom-shaped spindle head that is guided axially in a twistproof manner in the brake piston.

6. Vehicle brake according to claim 5,
   wherein the spindle head at a circumference thereof is provided with a plurality of radial projections, which engage into axial grooves that are formed in an inner circumferential surface of the hollow-cylindrical brake piston.

7. Vehicle brake having a housing and a brake piston arranged therein, which piston acts upon a friction element and is displaceable by means of a rotationally drivable spindle/nut arrangement arranged coaxially with a central axis of the brake piston into an actuating position, in which the brake piston presses the friction element against a rotor of the vehicle brake, wherein the spindle is secured against rotation and is moved by means of a rotation of a spindle nut in a translatory manner along the central axis either into abutment against the brake piston or away from the brake piston in dependence upon the direction of rotation,
   wherein the spindle nut comprises a one-piece first part, which at least close to one end thereof is configured for and in direct threaded engagement with the spindle, and a second part, which is configured for rotationally driving the first part and is connected to the first part by a rotationally fixed connection,
   wherein the first part at an other end thereof remote from the one end is provided with a support surface for the rotatable, axial mounting of the spindle/nut arrangement and the second part at the other end extends into the first part,
   wherein the brake piston is hollow-cylindrical and the spindle has a mushroom-shaped spindle head that is guided axially in a twistproof manner in the brake piston,
   wherein the spindle head at an underside thereof facing the spindle is provided with an indentation extending in circumferential direction, which has a front end face serving as a stop for a projection that is provided at a front end of the spindle nut facing the spindle head.

8. Vehicle brake according to claim 7,
   wherein a depth of the indentation increases continuously in the direction of and up to the front end face thereof.

9. Vehicle brake according to claim 8,
   wherein the projection has a shape that is complementary to the indentation.

10. Vehicle brake according to claim 1,
   wherein the support surface is supported on an annular plain- or needle bearing, which is in turn supported against the housing and through which the second part of the spindle nut projects.

11. Vehicle brake according to claim 1,
   wherein the brake piston is displaceable into the actuating position also by means of hydraulic pressure, which is introduced into a hydraulic chamber that interacts with the brake piston.

12. Vehicle brake according to claim 11,
   wherein the spindle/nut arrangement is of a self-locking design in order mechanically to lock the brake piston in the actuating position.

13. Vehicle brake according to claim 5,
   wherein the spindle head at an underside thereof facing the spindle is provided with an indentation extending in circumferential direction, which has a front end face serving as a stop for a projection that is provided at a front end of the spindle nut facing the spindle head.

14. Vehicle brake according to claim 7,
   wherein a depth of the indentation increases continuously in the direction of and up to the front end face thereof.

15. Vehicle brake according to claim 8,
   wherein the projection has a shape that is complementary to the indentation.

* * * * *